(12) United States Patent
Park et al.

(10) Patent No.: US 9,058,837 B2
(45) Date of Patent: Jun. 16, 2015

(54) METHOD AND APPARATUS FOR MANAGING CONTENTS

(75) Inventors: Sung-joon Park, Seoul (KR); Dong-yun Shin, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1917 days.

(21) Appl. No.: 11/417,137

(22) Filed: May 4, 2006

(65) Prior Publication Data

US 2006/0257102 A1 Nov. 16, 2006

(30) Foreign Application Priority Data

May 10, 2005 (KR) .................... 10-2005-0039049

(51) Int. Cl.
*H04N 9/80* (2006.01)
*G11B 20/00* (2006.01)
(Continued)

(52) U.S. Cl.
CPC .. *G11B 20/00086* (2013.01); *G06F 2221/2107* (2013.01); *G11B 20/00173* (2013.01); *G11B 20/0021* (2013.01); *G11B 20/00492* (2013.01); *G11B 20/00768* (2013.01); *G11B 20/00797* (2013.01); *G11B 20/0084* (2013.01); *H04N 5/913* (2013.01); *H04N 7/17318* (2013.01); *H04N 21/25816* (2013.01); *H04N 21/4135* (2013.01); *H04N 21/42684* (2013.01); *H04N 21/4334* (2013.01); *H04N 21/43622* (2013.01); *H04N 21/4367* (2013.01); *H04N 21/4408* (2013.01); *H04N 21/44204* (2013.01); *H04N 21/4627* (2013.01); *H04N 21/63345* (2013.01); *H04N 21/8352* (2013.01); *H04N 21/8355* (2013.01); *H04N 2005/91364* (2013.01)

(58) Field of Classification Search
USPC ......... 386/235, 236, 212, 213, 231, 291, 327, 386/239, 248, 252, 259
See application file for complete search history.

(56) References Cited

U.S. PATENT DOCUMENTS 5,897,218 A 4/1999 Nishimura et al.
6,694,023 B1 2/2004 Kim
(Continued)

FOREIGN PATENT DOCUMENTS

CN 1540941 10/2004
EP 1 361 759 11/2003
(Continued)

OTHER PUBLICATIONS

First Office Action issued in Chinese Patent Application No. 2006100801908 Jan. 23, 2009.
(Continued)

*Primary Examiner* — Thai Tran
*Assistant Examiner* — Mishawn Dunn
(74) *Attorney, Agent, or Firm* — Jefferson IP Law, LLP

(57) ABSTRACT

An apparatus and/or system implements a method for storing and reproducing contents received through broadcast signals, where the method of managing content includes reconstructing a broadcast signal received from a broadcasting company, transmitting a content ID and predetermined authentication information to the broadcasting company, the content ID used to discriminate content contained in the broadcast signal, receiving content management information including a content key corresponding to the content ID from the broadcasting company, encrypting the content using the content key, and storing the encrypted content in a content storage apparatus.

35 Claims, 9 Drawing Sheets

(51) Int. Cl.
*H04N 5/913* (2006.01)
*H04N 7/173* (2011.01)
*H04N 21/258* (2011.01)
*H04N 21/41* (2011.01)
*H04N 21/426* (2011.01)
*H04N 21/433* (2011.01)
*H04N 21/436* (2011.01)
*H04N 21/4367* (2011.01)
*H04N 21/4408* (2011.01)
*H04N 21/442* (2011.01)
*H04N 21/4627* (2011.01)
*H04N 21/6334* (2011.01)
*H04N 21/8352* (2011.01)
*H04N 21/8355* (2011.01)

(56) References Cited

U.S. PATENT DOCUMENTS

| | | | | |
|---|---|---|---|---|
| 6,799,271 B2 * | 9/2004 | Kugai | | 713/168 |
| 7,099,479 B1 * | 8/2006 | Ishibashi et al. | | 380/281 |
| 7,120,604 B2 * | 10/2006 | Maari | | 705/51 |
| 7,146,094 B1 * | 12/2006 | Boyle | | 386/212 |
| 7,359,883 B2 * | 4/2008 | Namba et al. | | 705/59 |
| 7,526,184 B1 * | 4/2009 | Parkinen et al. | | 386/291 |
| 2002/0150244 A1 * | 10/2002 | Kim et al. | | 380/201 |
| 2004/0103303 A1 * | 5/2004 | Yamauchi et al. | | 713/200 |
| 2004/0244032 A1 | 12/2004 | Yamada | | |
| 2005/0257056 A1 * | 11/2005 | Morita et al. | | 713/170 |
| 2008/0275991 A1 * | 11/2008 | Matsuzaki et al. | | 709/225 |
| 2010/0251357 A1 * | 9/2010 | Asano et al. | | 726/17 |

FOREIGN PATENT DOCUMENTS

| | | |
|---|---|---|
| JP | 10-164550 | 6/1998 |
| JP | 11-112950 | 4/1999 |
| KR | 2001-96924 A | 11/2001 |
| KR | 2004-63791 | 7/2004 |
| WO | WO 03/055132 | 7/2003 |
| WO | WO 2004/081744 | 9/2004 |

OTHER PUBLICATIONS

Notice of Allowance issued by Korean Intellectual Property Office in Korean Patent Application No. 2005-39049 on Jul. 23, 2007.

Search Report issued in European Patent Application No. 06113703.0-2223 by European Patent Office on Aug. 30, 2006.

* cited by examiner

FIG. 3

| KINDS OF PLAYBACK RESTRICTING INFORMATION | | DESCRIPTION |
|---|---|---|
| COUNT CONSTRAINT (510) | | POSITIVE INTEGER |
| DATETIME CONSTRAINT (520) | START | YY-MM-DD-hh:mm:ss |
| | END | YY-MM-DD-hh:mm:ss |
| ACCUMULATED PERIOD CONSTRAINT (530) | | hh:mm:ss |

FIG. 8
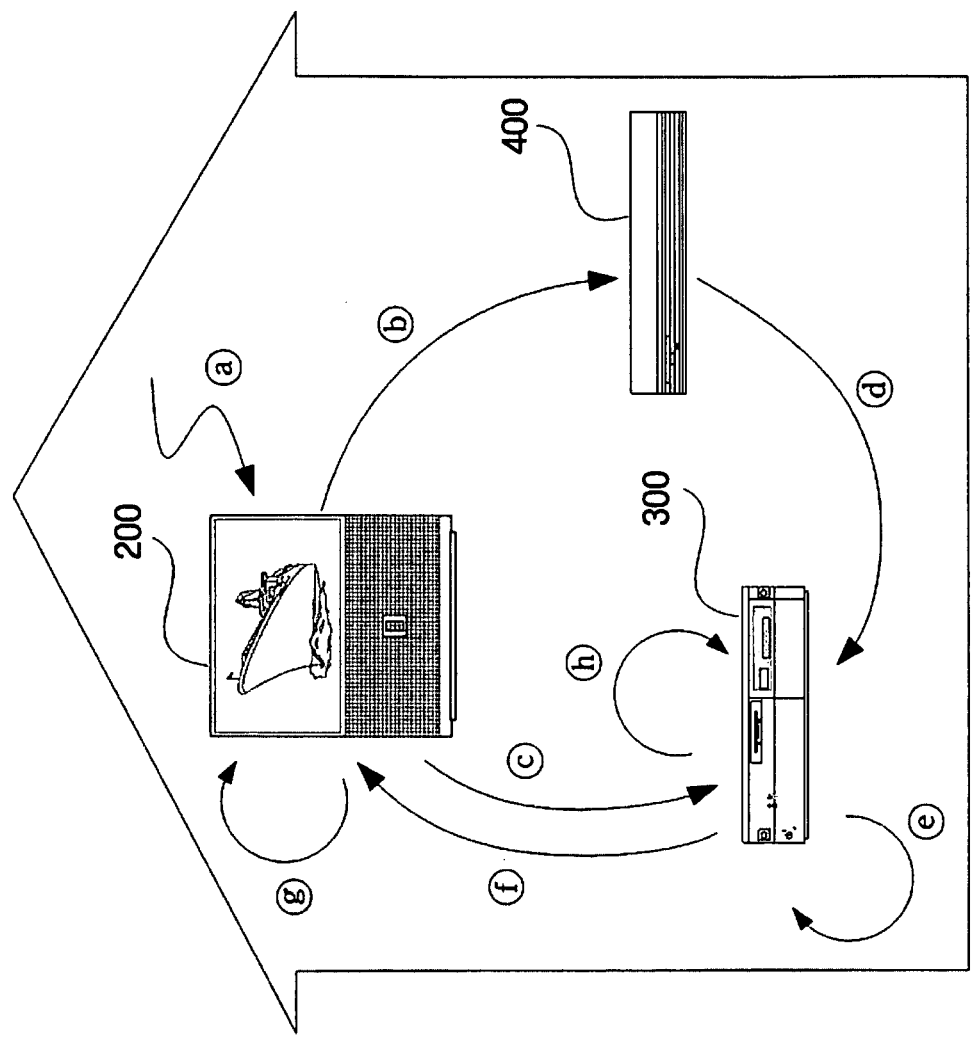
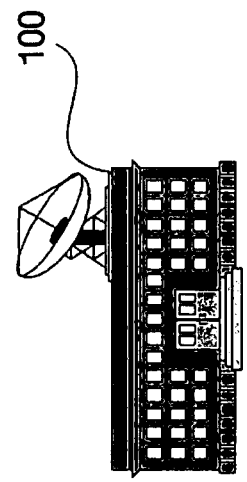

METHOD AND APPARATUS FOR MANAGING CONTENTS

CROSS-REFERENCE TO RELATED APPLICATION

This application claims priority from Korean Patent Application No. 2005-39049, filed on May 10, 2005 in the Korean Intellectual Property Office, the disclosure of which is incorporated herein by reference in its entirety.

BACKGROUND OF THE INVENTION

1. Field of the Invention

Aspects of the present invention relate to a method and apparatus for managing contents, and more particularly, to a content management method and apparatus for storing and playing back content received through broadcast signals.

2. Description of the Related Art

Presently, broadcasting systems are moving from an analog broadcasting system to a digital broadcasting system. Under a digital broadcasting environment, a gradual increase in a wide variety of digital multimedia service programs can be anticipated. Accordingly, techniques for effectively protecting and managing digital multimedia service providers' revenue and consumers' rights are being vigorously researched.

Digital data, in particular, can be easily and quickly copied and can be unlimitedly transmitted and distributed. In addition, even copied digital data provides flexibility in editing and composition without degrading the quality of the original digital data. In addition, recent developments in satellite-based or network-based data transmission technology would be a benefit to users because they can maximize a users' convenience by efficiently providing a variety of multimedia services, such as music or video services, to users. However, these technologies also pose a problem to service providers or copyright holders because they make it more difficult to stably provide multimedia content to users. This is especially true when considering that an increasing number of literary, musical, dramatic, or artistic works have been digitalized and digital data can be easily copied, edited, and distributed illegally using personal computers. Accordingly, additional research on the protection of copyrights of multimedia content is greatly needed.

Digital broadcasting is characterized by providing multiple channels, high-quality broadcast programs, and multiple functions. The development of multiplexing technology has enabled video, audio, and other data to be transmitted together, regardless of their contents and sizes. Further, multiplexing technology enables interactive services to be provided to many viewers through the formation of return channels based on modems. Accordingly, digital broadcasting can overcome restrictions of conventional analog broadcasting and can provide high value-added multimedia services to viewers. However, unless a desired level of security is established between a sender and a receiver of digital broadcasting, the current commercial base of digital broadcasting may collapse.

Broadcasting businesses anticipate that they will be able to break from conventional ways of doing business, such as depending on advertisement revenues. These businesses anticipate that they can provide high-quality broadcasting services to their subscribers by increasing the number and variety of channels and will be able to collect subscription fees from the subscribers for high-quality pay programs according to either a pay-per-time method or a pay-per-view method. In addition, broadcasting businesses also expect various multimedia data that they transmit to be received only by authorized subscribers. In order to solve all these problems, a conditional access system (CAS) has been developed.

In the CAS, a user of a set-top box is authenticated on a per-program basis by the CAS. Once authenticated, the set-top box is allowed to watch a pay program. In this manner, a per-program charging policy can be realized. Specifically, a user is entitled to watch a predetermined pay program or any pay programs for a predetermined amount of time if he or she pays an appropriate subscription fee. If the user's subscription right expires, the user is not able to watch pay programs unless he or she pays for them again.

To meet more sophisticated, highly versatile user demand, however, there is a need for a technique of storing authorized contents in a user's content storage apparatus and playing back the same from the user's content storage apparatus. Accordingly, a content management method for protecting pay contents is desirable.

SUMMARY OF THE INVENTION

Aspects of the present invention provide a content management method and apparatus, which can protect content provider's rights and can separately store contents that a user has paid to access and use and can play back when necessary.

According to an aspect of the present invention, there is provided a method of managing content includes reconstructing a broadcast signal received from a broadcasting company, transmitting a content ID and predetermined authentication information to the broadcasting company, the content ID used to discriminate content contained in the broadcast signal, receiving content management information including a content key corresponding to the content ID from the broadcasting company, encrypting the content using the content key, and storing the encrypted content in a content storage apparatus.

According to another aspect of the present invention, there is provided an apparatus for managing content including a reconstruction module which reconstructs a broadcast signal received from a broadcasting company, a network interface module which transmits a content ID and predetermined authentication information to the broadcasting company and receives content management information including a content key corresponding to the content ID from the broadcasting company, the content ID used to discriminate content contained in the broadcast signal, an encryption/decryption module which encrypts the content using the content key, and a device interface module which stores the encrypted content in a content storage apparatus.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and/or advantages of the present invention will become more apparent and more readily appreciated by describing in detail embodiments thereof with reference to the accompanying drawings in which:

FIG. 3 is a table illustrating playback restricting information according to an embodiment of the present invention;

FIG. 8 is a diagram illustrating a content playback procedure of the content management system according to an embodiment of the present invention.

DETAILED DESCRIPTION OF THE EMBODIMENTS

Figure 1:
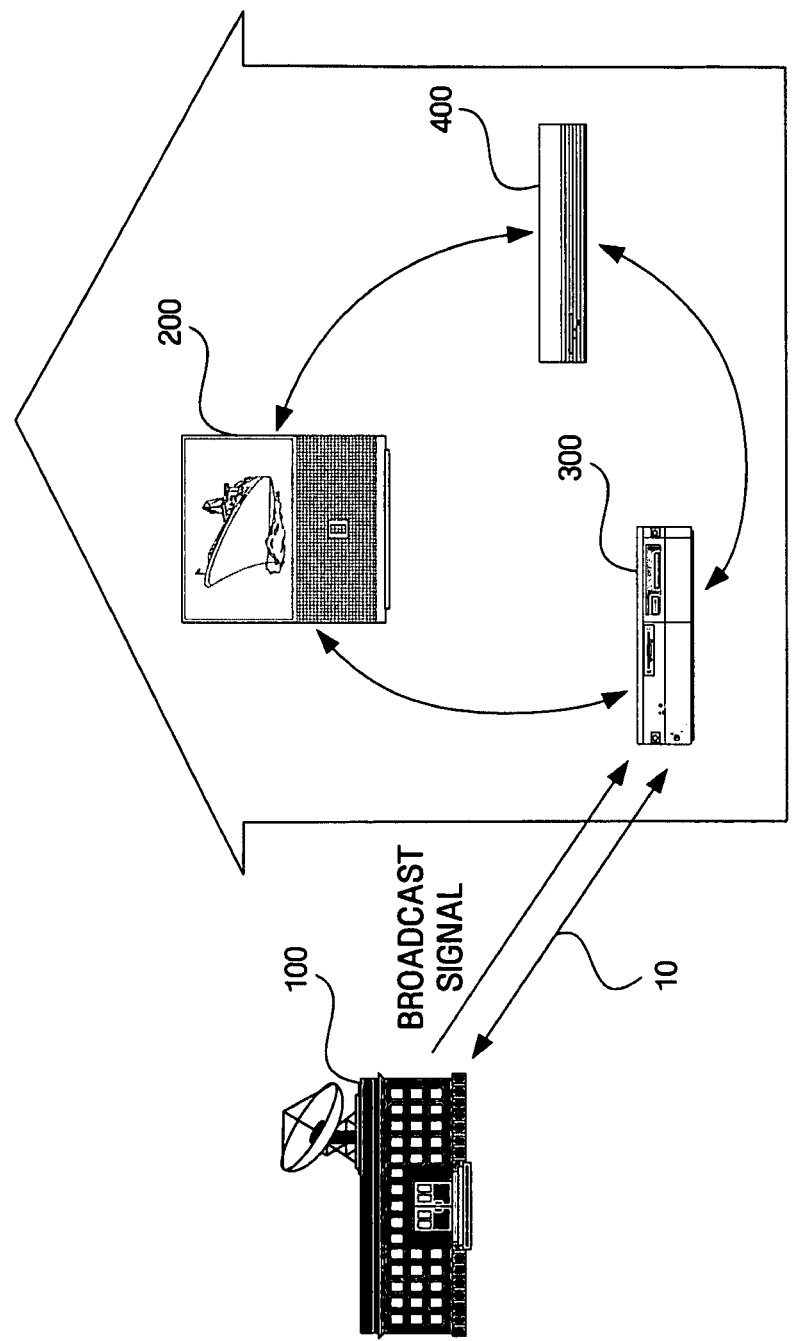
FIG. 1 is a content management system according to an exemplary embodiment of the present invention.

Advantages and features of the present invention and methods of accomplishing the same may be understood more readily by reference to the following detailed description of embodiments of the invention and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

FIG. 1 is a content management system according to an exemplary embodiment of the present invention. The content management system includes a broadcasting company 100, a content management apparatus 300, a display apparatus 200, and a content storage apparatus 400. While shown as separate, it is understood that ones of the apparatuses 200, 300, 400 can be combined in aspects of the invention.

The broadcasting company 100 produces broadcast signals including contents. By way of example, the contents may include various broadcast programs, such as movies, dramas, sports, and a variety of entertaining programs, provided by the broadcasting company 100. In addition, the contents may be service objects in each program. Examples of the service objects include individual services available in a broadcast program and examples thereof include game events among garners in on-line game broadcast programs, broadcasting for presentation of shopping lists in a home shopping program, educational items used in Distance Learning and so on.

While not required in all aspects, the broadcasting company 100 may provide such contents through pay programs. To prevent unauthorized users from using such contents, the broadcasting company 100 produces scrambled broadcast signals. The broadcast signals produced by the broadcasting company 100 may be applied in satellite broadcasting, cable broadcasting, or ground wave broadcasting according to the infrastructure of the broadcasting company 100. Thus, the content management apparatus 300 may further comprise corresponding broadcast signal receiving means.

In addition, a signal exchange channel 10 occurs in which, in response to a request from the content management apparatus 300, the broadcasting company 100 provides the content management apparatus 300 with a predetermined key. Using the key, contents can be encrypted or decrypted (hereinafter, to be referred to as a content key) according to playback restricting information of the corresponding content. The playback restricting information includes information about a number of times of playback, an accumulated period of playback, and the like, which will later be described with reference to FIG. 3.

The content management apparatus 300 reconstructs broadcast signals transmitted from the broadcasting company 100. As shown, the content management apparatus 300 selectively descrambles the broadcast signals through user authentication. However, it is understood that descrambling is not required in all aspects.

While not required in all aspects, the user authentication may be performed by a user's purchased portable storage medium (not shown). The portable storage medium can be inserted into or detached from the content management apparatus 300 by user's manipulation, and is memory capable of reading and writing predetermined data. However, it is understood that the authentication can be non-portable and can be embedded in the apparatus 300.

The portable storage medium has a predetermined authentication parameter for user authentication stored therein. If an authentication parameter contained in a broadcast signal is the same with the predetermined authentication parameter stored in the portable storage medium, the user authentication is successfully completed. Examples of the portable storage medium include smart media, secure digital cards, memory sticks, and the like. A more preferred example of the portable storage medium is a smart card. In the following description, a smart card will be described as a portable storage medium by way of example. However, the portable storage medium according to embodiments of the present invention is not restricted to the smart card. Moreover, it is understood that authentication can be performed through passwords and/or biometrics such that storage media are not required in all aspects.

In one embodiment, to implement a content security technique for providing broadcast services of pay programs between the broadcasting company 100 and the content management apparatus 300, the conditional access system (CAS) may be employed.

Meanwhile, the content management apparatus 300 requests the broadcasting company 100 to transmit a content key of content that the user intends to store and playback restricting information of the content key. If the content key and the playback restricting information are transmitted from the broadcasting company 100, the content management apparatus 300 encrypts the content contained in the received broadcast signals using the content key transmitted from the broadcasting company 100 and transmits the encrypted content to the content storage apparatus 400. In this way, return channel 10 (such as through an Internet Protocol) is formed between the broadcasting company 100 and the content management apparatus 300, thereby, rendering an inactive service between the broadcasting company 100 and the content management apparatus 300. Therefore, a request for an encryption key and playback restricting information from the content management apparatus 300 or transmission of an encryption key and playback restricting information from the broadcasting company 100 may be performed through formation of the return channel 10.

A network interface module 350 (shown in FIG. 2) supports Internet Protocol (IP) based communication and is connected with the broadcasting company 100 through the return channel 10. The content management apparatus 300 can provide users with interactive services with the broadcasting company 100 through the network interface module 350. However, it is understood that other modules 350 can be used, and that the channel 10 can be established through a common network or using separate networks (i.e., one for transmission, one for reception).

If a playback command is input from the display apparatus 200, the content management apparatus 300 decrypts the encrypted content transmitted from the content storage apparatus 400 into a content key corresponding to the content and provides the decrypted content key to the display apparatus 200. Here, the content management apparatus 300 provides contents within a limited range based on the playback restricting information of the corresponding content and updates the playback restricting information of the corresponding content with the content provided to the display apparatus 200.

While not required in all aspects, the content management apparatus 300 may be a network interface unit (NIU) which can receive digital broadcasting channels, such as a set-top box.

The content storage apparatus 400, which is shown as an A/V HDD (Audio/Video Hard Disk Drive), stores contents transmitted from the content management apparatus 300. In addition, in response to a request from the display apparatus 200, the content storage apparatus 400 transmits contents stored therein to the content management apparatus 300. Since the contents stored in the content storage apparatus 400 are encrypted by the content management apparatus 300 in content key formats, security of the contents can be ensured. While the illustrated content management system includes a single content storage apparatus 400, the invention is not limited thereto and can also be applied to a content management system having one or more content storage apparatuses connected across wired and/or wireless signals.

The display apparatus 200 displays contents provided by the content management apparatus 300. In addition, the display apparatus 200 may provide users with a graphic user interface (GUI) for displaying Electronic Program Guide (EPG) data contained in broadcast signals in response to a user's request. Examples of the display apparatus 200 include a digital TV, computers and other like display devices. The content management apparatus 300 and the content storage apparatus 400 are connected to one another in a daisy-chain scheme in view of the display apparatus 200. Thus, when a user inputs a request to store or play back content, the display apparatus 200 may instruct the content management apparatus 300 or the content storage apparatus 400 to perform a predetermined operation necessary to store or play back the content.

Meanwhile, to prevent illegal reproduction of contents during data transmission between each of the content management apparatus 300, the content storage apparatus 400, and the display apparatus 200, a predetermined security protocol such as DTCP (Digital Transmission Content Protection) is used.

According to one embodiment of the present invention, the content management apparatus 300, the content storage apparatus 400, and the display apparatus 200 can be interconnected using a technique called XHT (expandable Home Theater) as middleware for A/V Home Networking. An expandable Home Theater (XHT) as a home network solution based on a digital TV has been developed by Samsung and has been adopted by the U.S. Consumer Electronics Association (CEA) standard for home networking. According to the XHT solution, an A/V device connected with a digital TV and a plurality of digital TVs can be controlled using an Institute of Electrical and Electronics Engineers (IEEE) 1394 cable that can stably transmit high definition (HD) signals and an Internet protocol (IP) that is a communication protocol usually used on Internet. When the XHT is used, a user in a bedroom can view digital broadcasting using a digital broadcast receiving function of a digital TV installed in a living room. However, it is understood that other home networking systems can be implemented to provide A/V home networking or other networking in which A/V data is transferred.

While not required in all aspects, a cheap network interface unit (NIU) using the XHT is made in a format of a memory card and is thus easy to change according to a receiving scheme such as a terrestrial, satellite, or cable scheme. This NIU reduces a financial burden of a broadcasting company. In particular, the XHT can provide diverse portal services through a browser embedded in a digital TV.

Figure 2:
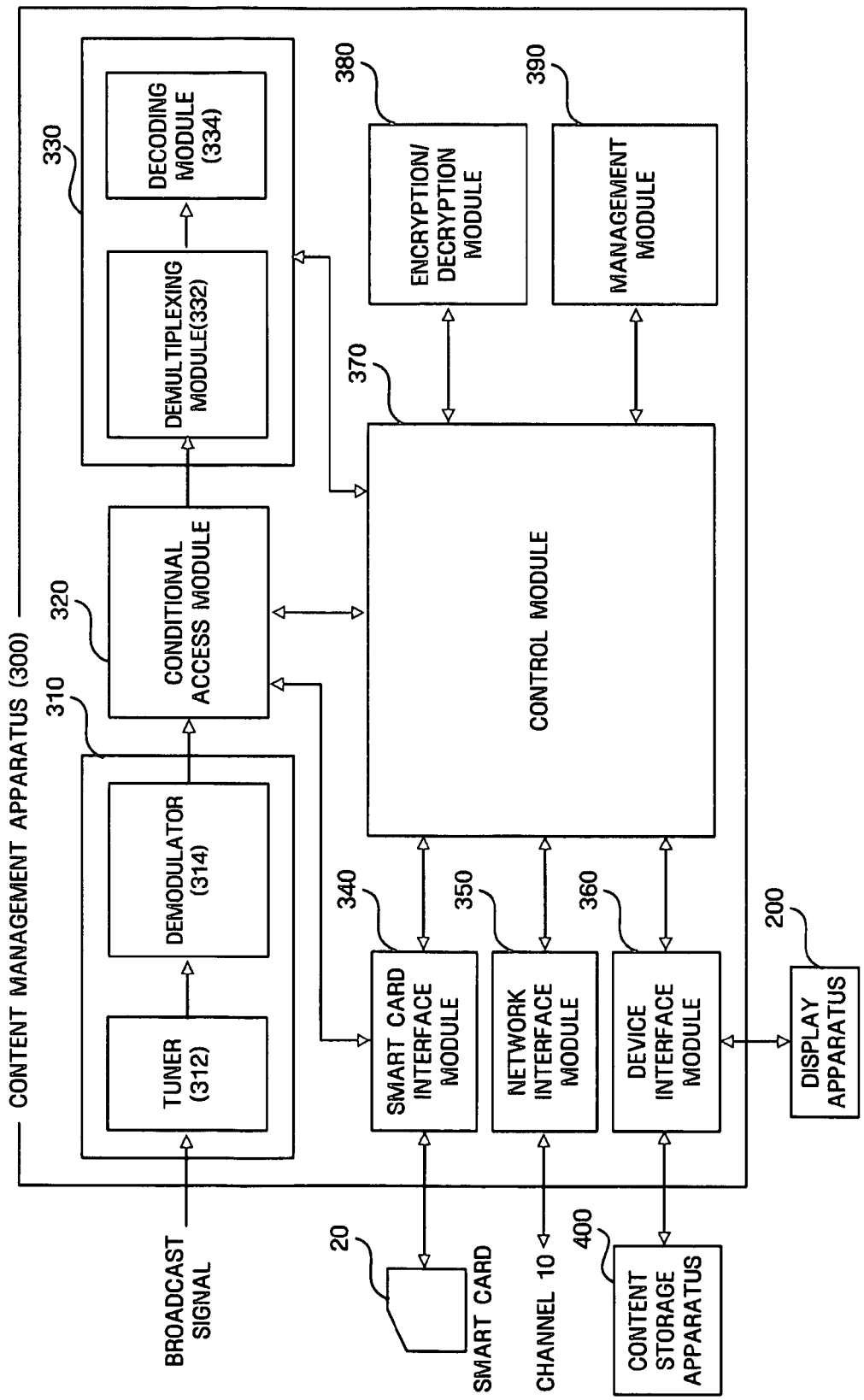
FIG. 2 is a block diagram of a content management apparatus according to an exemplary embodiment of the present.
Figure 4:
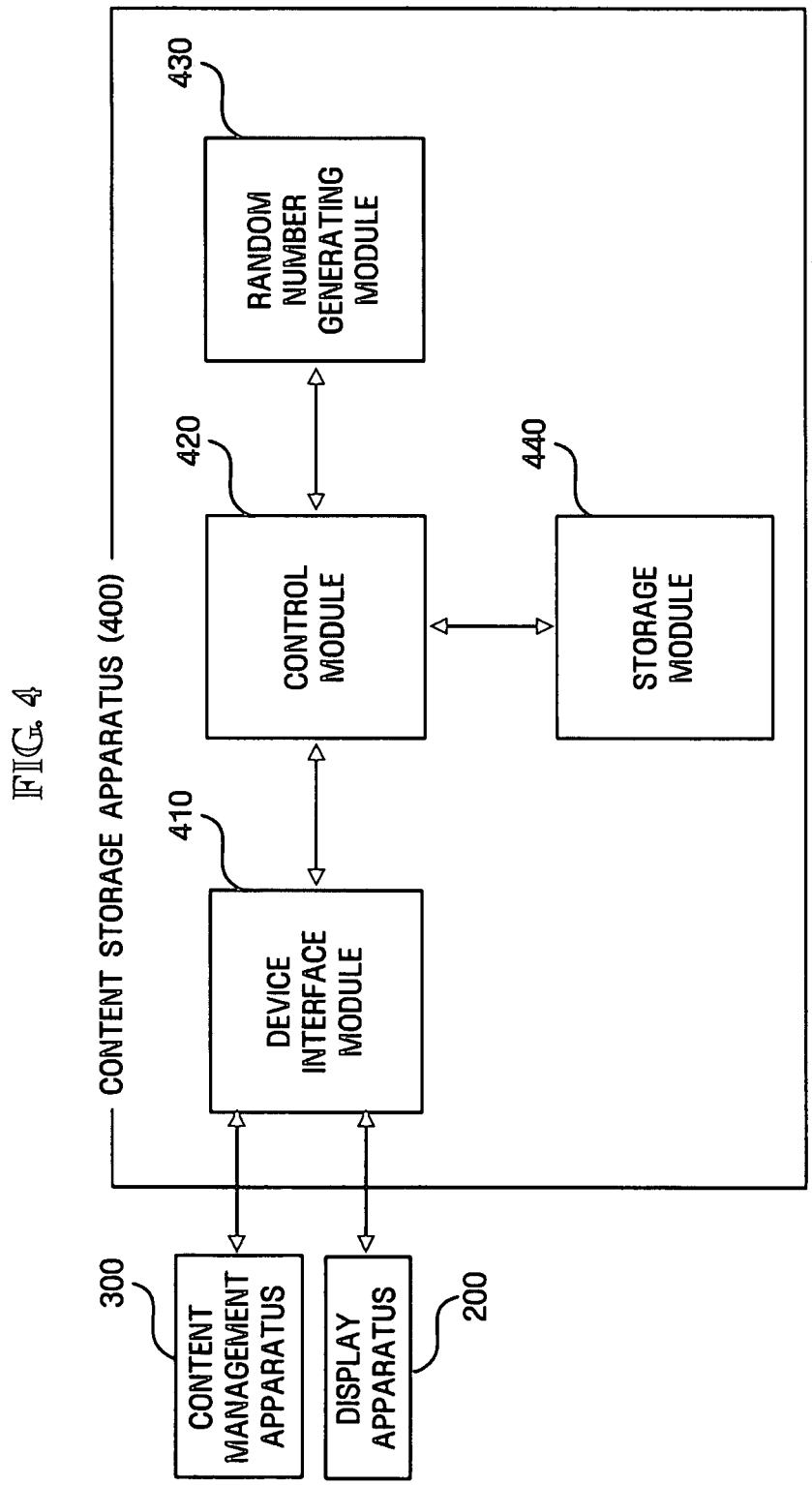
FIG. 4 is a block diagram of a content storage apparatus according to an exemplary embodiment of the present.

With reference to FIGS. 2 through 4, the content management apparatus 300 and content storage apparatus 400 according to an exemplary embodiment of the present invention will be described. FIG. 2 is a block diagram of the content management apparatus 300 according to an exemplary embodiment of the present invention. Referring to FIG. 2, the content management apparatus 300 includes a broadcast signal receiving module 310, a conditional access module 320, a reconstruction module 330, a smart card interface module 340, the network interface module 350, a device interface module 360, a control module 370, an encryption/decryption module 380, and a management module 390.

The broadcast signal receiving module 310 receives a broadcast signal and comprises a tuner 312 and a demodulator 314. The tuner 312 receives the broadcast signal, converts the broadcast signal into an intermediate frequency (IF) signal, and provides the IF signal to the demodulator 314. For example, the tuner 312 receives a broadcast signal from a satellite, detects an I/Q signal from the received broadcast signal, and provides the detected I/Q signal to the demodulator 314. The demodulator 314 reconstructs a transport stream from the IF signal provided from the tuner 312 and provides the reconstructed transport stream to the conditional access module 320. For example, the demodulator 314 may comprise a quadratic phase shift keying (QPSK) demodulator, which performs a QPSK demodulation operation, and/or a forward error correction (FEC) demodulator, which performs a FEC demodulation operation.

The conditional access module 320 performs user authentication using a smart card 20. In detail, the conditional access module 320 compares an authentication parameter contained in the transport stream provided by the demodulator 314 with the authentication parameter read from the smart card 20 by the smart card interface module 340. The conditional access module 320 performs user authentication by determining whether a user of the content management apparatus 300 is an authorized user based on the comparison results. If the two authentication parameters are the same with each other, the user is determined to be an authorized user. If not, the user is determined to be an unauthorized user.

If the user is determined to be an authorized user (i.e., if the user authentication succeeds), the conditional access module 320 descrambles the transport stream provided by the demodulator 314. However, if the user is determined to be an unauthorized user (i.e., if the user authentication fails), the conditional access module 320 does not descramble the transport stream. Thus, descrambling is performed on broadcast signals of channels that a user has paid to conditionally access, whereas no descrambling is performed on broadcast signals of channels for which the user has not paid.

The reconstruction module 330 reconstructs a video signal, an audio signal and a data signal using the transport stream descrambled by the conditional access module 320. However, if the conditional access module 320 does not descramble the transport stream, the reconstruction module 330 cannot properly reconstruct the video signal, the audio signal and the data signal contained in the transport stream.

To reconstruct the transport stream, the reconstruction module 330 includes a demultiplexing module 332 and a decoding module 334. The demultiplexing module 332 parses the descrambled transport stream provided from the conditional access module 320, separates the video signal, the audio signal and the data signal from one another and provide the separated signals to the decoding module 334. The decoding module 334 includes a video decoder (not shown) and an audio decoder (not shown) to decode the video signal and the audio signal provided from the demultiplexing module 332, respectively. By way of example, the video decoder may be realized using various video decompression methods and standards, such as Moving Picture Experts Group (MPEG)-2, MPEG-4, and so on, and the audio decoder may be realized using various audio decompression methods and standards, such as MPEG Layer-3 (MP3), Audio Compression-3 (AC-3), and so on. However, it is understood that other video and audio decoders can be used, and both video and audio need not be decoded in the module 334.

While not required in all aspects, the decoding module 334 may include a data decoder (not shown), which decodes the data signal provided from the demultiplexing module 332. The data signal includes EPG (Electronic Program Guide) data containing information regarding broadcast programs, such as a channel number, a broadcast date, a broadcast start time, a content identifier, a program description, or the like. In addition, the EPG data may include a predetermined key value. Moreover, other types of data can be included in addition to or instead of EPG data, such as software.

While not required in all aspects, the predetermined key value is a public key used in public-key cryptography. The public key may be optionally provided by the broadcasting company 100 by broadcasting channel, program, or service object in each program, and a private key corresponding to the public key is managed by the broadcasting company 100.

The smart card interface module 340 reads the smart card 20 and provides the authentication parameter stored in the smart card 20 to the conditional access module 320. In an alternative embodiment, the smart card 20 may be replaced with another portable storage medium. In such a case, the smart card interface module 340 may be realized by a portable storage medium interface module that can be connected with the corresponding portable storage medium. Alternately, other mechanisms can be used to provide authentication, such as biometrics and/or password entry.

The network interface module 350 supports Internet Protocol (IP) based communication and is connected with the broadcasting company 100 through a return channel 10. The content management apparatus 300 can provide users with interactive services with the broadcasting company 100 through the network interface module 350.

The device interface module 360 performs communication between the display apparatus 200 and the content storage apparatus 400. While performing communication between the display apparatus 200 and the content storage apparatus 400, the device interface module 360 may employ a security protocol for preventing illegal reproduction. Preferably, the device interface module 360 may be realized by a DTCP (Digital Transmission Content Protection) based IEEE 1394 module. However, it is understood that other modules and protocols can be used, including wired and/or wireless protocols.

The control module 370 controls operations of various modules of the content management apparatus 300. In particular, the control module 370 requests the broadcasting company 100 to transmit an encryption key and playback restricting information. The encryption key, with which the requested content can be encrypted. The playback condition information contains right information regarding a right to play back the content.

In addition, when the content is transmitted from the content storage apparatus 400, the control module 370 determines whether to play back the content using the playback restricting information thereof. If the content is played back, the control module 370 updates the playback restricting information of the content.

The encryption/decryption module 380 encrypts/decrypts data under the control of the control module 370. The encryption/decryption module 380 performs a public-key cryptography encryption scheme such as Diffie-Hellman, RSA (Rivest-Shamir-Adleman), ElGamal, or Elliptic Curve, and a symetric-key cryptography encryption scheme such as DES (Data Encryption Standard) or AES (Advanced Encryption Standard). However, other encryption/decryption methodologies can be used.

The management module 390 manages content IDs and public keys corresponding to the content IDs. Each of the content IDs and each of the public keys corresponding to the content IDs are stored in the broadcast signals, preferably in EPG data contained in a data signal included the broadcast signals. Thus, when a content ID is transmitted from the display apparatus 200, the management module 390 extracts a public key corresponding to the received content ID from the EPG data. In addition, the management module 390 manages content keys received from the broadcasting company 100 and storage content IDs. In addition, the management module 390 manages key information transmitted from the content storage apparatus 400. To this end, the management module 390 may have a logically or physically protected storage area, and the storage content IDs and corresponding content keys, and the key information transmitted from the content storage apparatus 400 may be stored in the logically or physically protected storage area. However, the keys can be otherwise stored on the apparatus 300 or in other media connectable to the apparatus 300, such as the card 20.

FIG. 3 is a table illustrates playback restricting information according to an embodiment of the present invention. The shown playback restricting information includes a restricted number of times of playback 510, a restricted number of datetime of playback 520, and a restricted period of playback 530, which will be abbreviated as a count constraint 510, a datetime constraint 520 and an accumulated period constraint 530. While shown as including all the count constraint 510, the datetime constraint 520, and the accumulated period constraint 530, it is understood that fewer than all three constraints can be used, and that other constraints can be included in addition to or instead of the shown constraints 510, 520, 530.

The count constraint 510 defines a restricted number of times of playback and has a positive value. For example, if the count constraint 510 is set to N in the playback restricting information (N is a positive integer), the control module 370 of the content management apparatus 300 provides the display apparatus 200 N times with the content restricted by the playback restricting information. Thus, the target content is granted reproduction only N times.

The datetime constraint 520 defines a restricted date/time of playback. Accordingly, if the datetime constraint 520 is set in the playback restricting information, the control module 370 of the content management apparatus 300 provides the display apparatus 200 with the content restricted by the playback restricting information. Thus, the content is not played back before the start date or after the end date.

The accumulated period constraint 530 defines an accumulated measured period of time while the content is played back. For example, if the accumulated period constraint 530 is set to 10 hours in the playback restricting information, the control module 370 of the content management apparatus 300 provides the display apparatus 200 with the content for 10 hours.

If the count constraint 510 or the accumulated period constraint 530 is set in the playback restricting information, the control module 370 of the content management apparatus 300 counts the number of times of playback or the period of playback while the content restricted by the playback restricting information is provided to the display apparatus 200. To this end, the control module 370 may separately manage counted values of the restricted number or the restricted accumulated period of playback, or may update the playback restricting information. Further, it is understood that the constraints 510, 520, 530 can be later updated, such as when additional time or number of times N are purchased by the user.

Meanwhile, the above-described playback restricting information is provided for purposes of illustration only and may further include additional types of constraints to the playback restricting information.

FIG. 4 is a block diagram of a content storage apparatus 400 according to an exemplary embodiment of the present. The content storage apparatus 400 comprises a device interface module 410, a control module 420, a random number generation module 430, and a storage module 440. The device interface module 410 performs communication between the display apparatus 200 and the content management apparatus 300. While not required in all aspects, the communication between the display apparatus 200 and the content management apparatus 300 performed by the device interface module 410 employs a security protocol HDCP (High-bandwidth Digital Content Protection) for preventing illegal reproduction. While not required in all aspects, the device interface module 410 may be realized by a DTCP (Digital Transmission Content Protection) based IEEE 1394 module.

The control module 420 controls operations of various modules of the content management apparatus 400. In addition, when the control module 420 receives a request from the display apparatus 200 to generate key information, the key information is transmitted to the content management apparatus 300 through the device interface module 410. While not required in all aspects, the key information may be at least one of a random number generated by a random number generating module 430, a DTLA key value supplied from a DTLA (Digital Transmission Licensing Administrator), or a combination thereof.

Meanwhile, if a content playback request is received from the display apparatus 200, the control module 420 searches for a requested content from the storage module 440 and transmits the searched content to the content management apparatus 300 through the device interface module 410.

The random number generating module 430 generates a predetermined random number. The predetermined random number may be a sequence of numbers or characters having randomness, or a combination thereof. This random number is used to generate key information.

The storage module 440 stores the contents. The contents stored in the storage module 440 are encrypted by the content management apparatus 300 and may be stored together with storage content IDs transmitted from the content management apparatus 300.

Hereinafter, the operation of the content management system, which has been described with reference to FIGS. 1 through 4, will be described. The present invention is largely divided into a content storage procedure and a content playback procedure. Therefore, for a better understanding of the present invention, the invention will be described in view of the content storage procedure and the content playback procedure.

Content Storage Procedure

Figure 5:
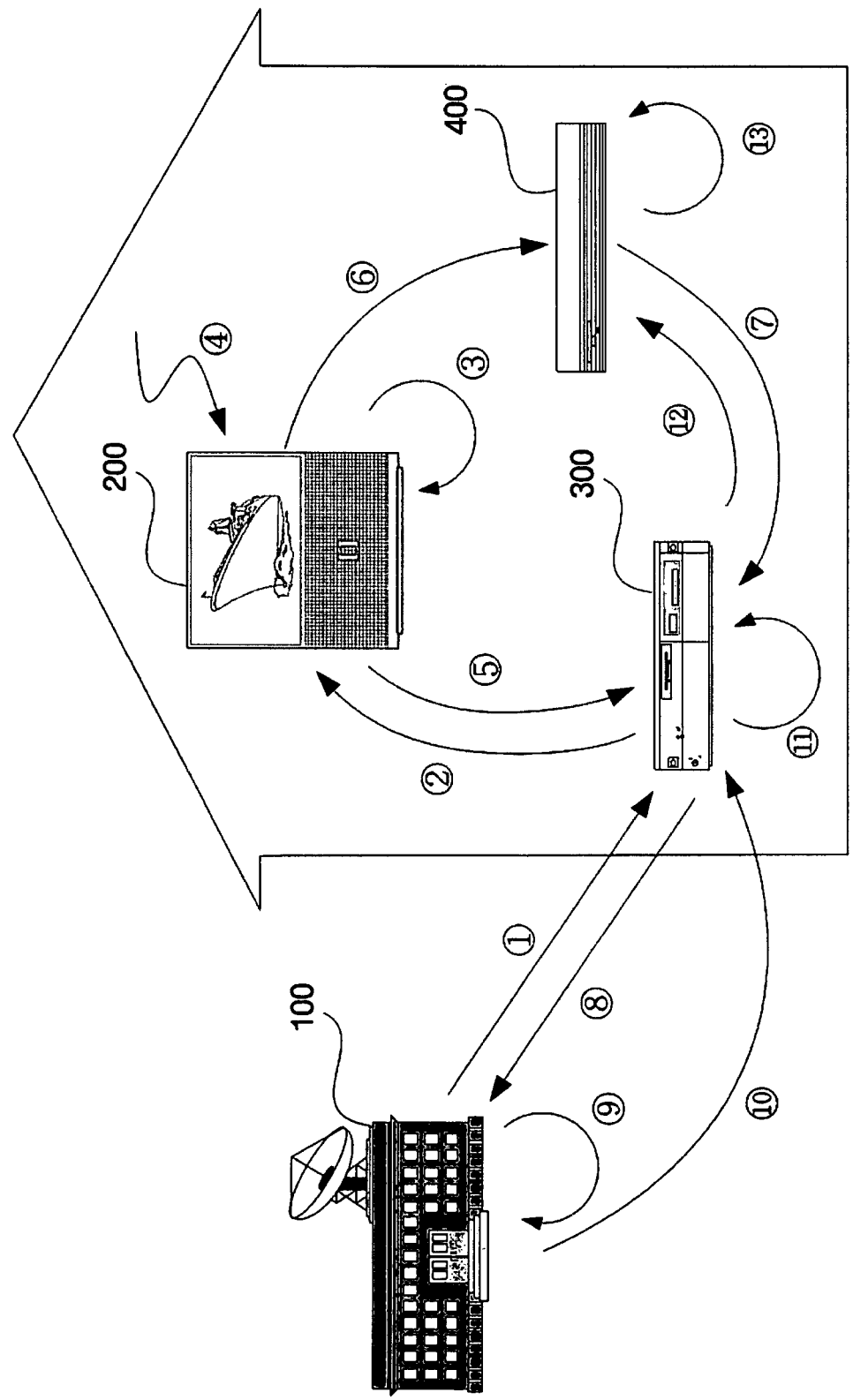
FIG. 5 is a diagram illustrating a content storage procedure of a content management system according to an embodiment of the present invention.

FIG. 5 is a diagram illustrating a content storage procedure of the content management system according to an embodiment of the present invention. The broadcasting company 100 produces a broadcast signal (①). The content management apparatus 300 receives the broadcast signal, reconstructs the same and supplies the display apparatus 200 with the reconstructed broadcast signal (②). Here, the display apparatus 200 displays content contained in the reconstructed broadcast signal so that the user to view the content. Upon a user's request, GUI (Graphic User Interface) for displaying content data is displayed to the user using EPG data contained in the broadcast signal (③).

If the user inputs a request to store a particular content to store (④), the display apparatus 200 transmits a content ID of the requested content to the content management apparatus 300 (⑤). In addition, the display apparatus 200 requests to the content storage apparatus 400 to generate predetermined key information (⑥). In response to the request from the display apparatus 200, the content storage apparatus 400 generates the predetermined key information and transmits the generated key information to the content management apparatus 300 (⑦).

After receiving the content ID and key information, the content management apparatus 300 encrypts the predetermined authentication information and transmits the encrypted authentication information with the content ID to the broadcasting company 100 (⑧). The authentication information may be at least one of key information received from the content storage apparatus 400 and a storage medium ID capable of discriminating the smart card 20. Keys used to encrypt the key information and the storage medium ID can be extracted from the broadcast signal. Preferably, the content management apparatus 300 extracts a public key from the EPG data contained in the broadcast signal transmitted from the broadcasting company 100 and encrypts the authentication information using the public key. Meanwhile, the content management apparatus 300 transmits a hash value of the authentication information with the content ID and the encrypted authentication information to the broadcasting company 100.

The broadcasting company 100 decrypts the encrypted authentication information using a private key corresponding to the content ID received from the content management apparatus 300 (⑨). If the hash value of the authentication information is received from the content management apparatus 300, the broadcasting company 100 determines whether or not the hash value of the authentication information is the same with a result value of a predetermined hash function with respect to the decrypted authentication information, thereby confirming integrity and adaptability of received data.

According to the determined result using the hash value, if the received data received data is determined to be normal, the broadcasting company 100 transmits the content management information corresponding to the content ID received from the content management apparatus 300 and the corresponding content ID to the content management apparatus 300 (⑩). The content management information includes content keys with which contents can be encrypted/decrypted, playback restricting information of the contents, and storage content IDs. When content is encrypted using a content key, a storage content ID is used to discriminate the encrypted content from other contents.

Meanwhile, the content management information may be transmitted in an encrypted state using decrypted authentication information. Preferably and while not required, the broadcasting company 100 may encrypt the content management information using key information included in the authentication information.

The content management apparatus 300 decrypts the encrypted content management information transmitted from the broadcasting company 100 using the authentication information and encrypts the user's requested content using the encryption key (⑪). Then, the content management apparatus 300 transmits the storage content ID and the encrypted content to the content storage apparatus 400 (⑫). The content storage apparatus 400 stores the received storage content ID and the encrypted content (⑬).

Figure 6:
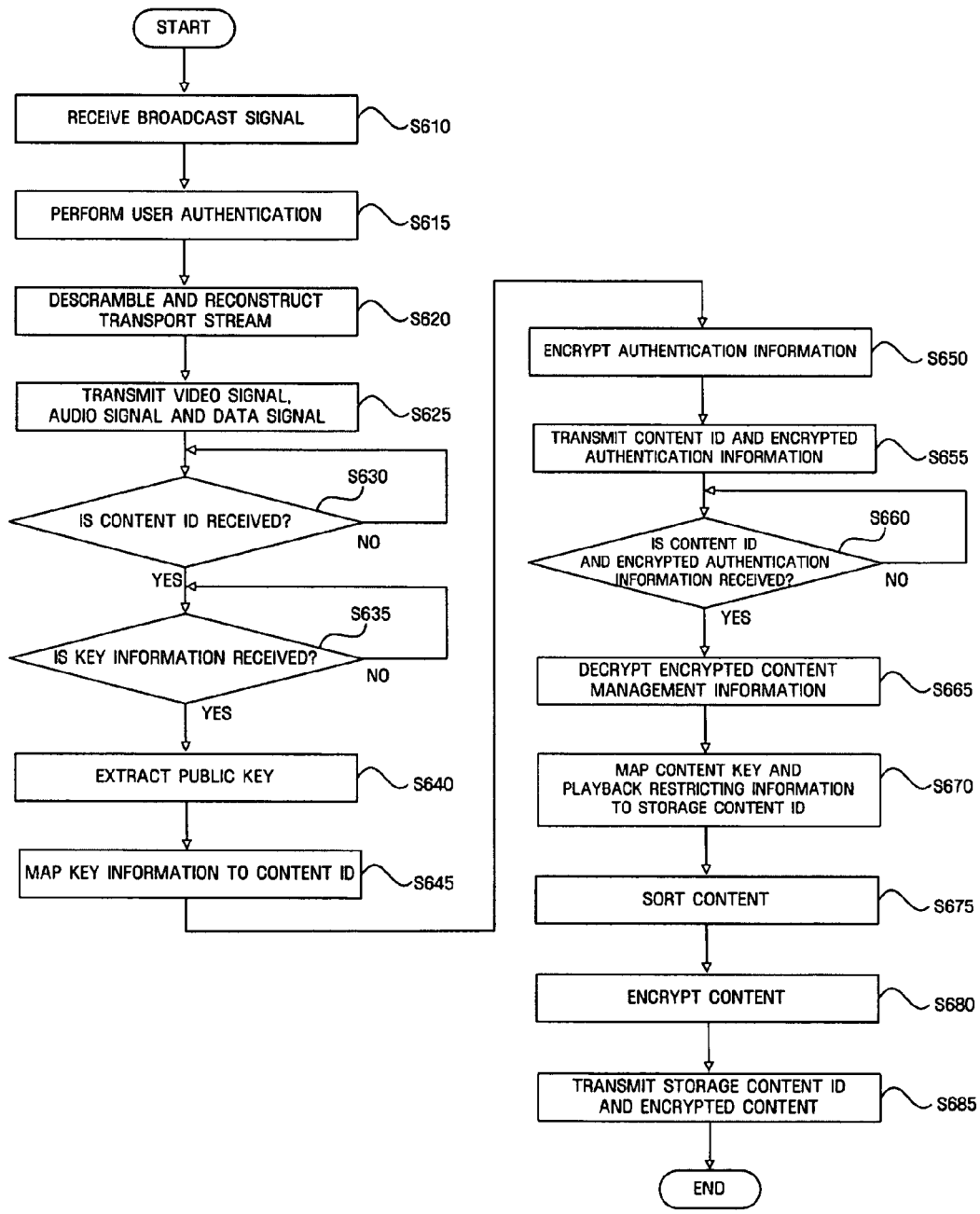
FIG. 6 is a flowchart illustrating a content management method according to an embodiment of the present invention.

Operations of the content management apparatus 300 and the content storage apparatus 400 during the content storage procedure will be described in detail with reference to FIGS. 6 and 7. FIG. 6 is a flowchart illustrating a content management method according to an embodiment of the present invention, illustrating the operation of the content management apparatus 300 during the content storage procedure.

When the broadcast signal receiving module 310 receives a broadcast signal (operation S610), the conditional access module 320 performs user authentication using the authentication parameter read from the smart card 20 and provided through the smart card interface module 340 (operation S615). If the user authentication fails, the conditional access module 320 provides a scrambled transport stream to the reconstruction module 330. In this case, that is, when the user authentication fails, a video signal, an audio signal and a data signal cannot be reconstructed properly and cannot be used.

When the user authentication succeeds, the conditional access module 320 descrambles the transport stream transmitted from the broadcast signal receiving module 310 and the reconstruction module 330 reconstructs the descrambled transport stream in operation S620. In operation S625, the device interface module 360 transmits the reconstruction result of the reconstruction module 330 (that is, a video signal, an audio signal and a data signal), to the display apparatus 200. The device interface module 360 receives a content ID from the display apparatus 200 (operation S630), and receives key information from the content storage apparatus 400 (operation S635). The management module 390 extracts a public key corresponding to the content ID received from the display apparatus 200 from the broadcast signal (operation S640) and maps the key information received from the content storage apparatus 400 to the content ID received from the display apparatus 200 (operation S645). The public key is preferably extracted from the EPG data contained in the data signal in the broadcast signal.

The encryption/decryption module 380 encrypts/decrypts predetermined authentication information using the extracted public key (operation S650). The predetermined authentication information includes at least one of key information received from the content storage apparatus 400 and a storage medium ID for discriminating the smart card 20.

The control module 370 transmits the content ID received from the display apparatus 200 and the authentication information encrypted by the encryption/decryption module 380 to the broadcasting company 100 through the network interface module 350 (operation S655). Here, the control module 370 may transmit to the broadcasting company 100 a hash value of the authentication information as well as the content ID and the encrypted authentication information.

When the network interface module 350 receives the content ID and encrypted content management information from the broadcasting company 100 (operation S660), the encryption/decryption module 380 decrypts the encrypted content management information (operation S665). The content management information includes content keys with which contents can be encrypted/decrypted, playback restricting information of the contents, and storage content IDs. When content is encrypted using a content key, a storage content ID is used to discriminate the encrypted content from other contents.

While not required in all aspects, the received content management information may be in an encrypted state by the authentication information transmitted from the broadcasting company 100 in operation S655. Preferably, the content key, the playback restricting information, and the content ID are all in encrypted states using key information. Accordingly, the management module 390 can provide the encryption/decryption module 380 with the key information corresponding to the content ID received from the broadcasting company 100. The encryption/decryption module 380 can decrypt the encrypted content management information using the key information.

In operation S670, the management module 390 maps the playback restricting information and the content key to the storage content ID. If the storage content ID is not contained in the content management information received from the broadcasting company 100, the management module 390 may map the playback restricting information or the content key to the content ID or separately generated identification information.

The control module 370 sorts content corresponding to the content ID from the broadcast signal through the reconstruction module 330 (operation S675), and the encryption/decryption module 380 encrypts the sorted content using a content key (operation S680). When the content is encrypted, the control module 370 transmits the encrypted content and a storage content ID into which the encrypted content is mapped to the content storage apparatus 400 through the device interface module 360 (operation S685).

Figure 7:
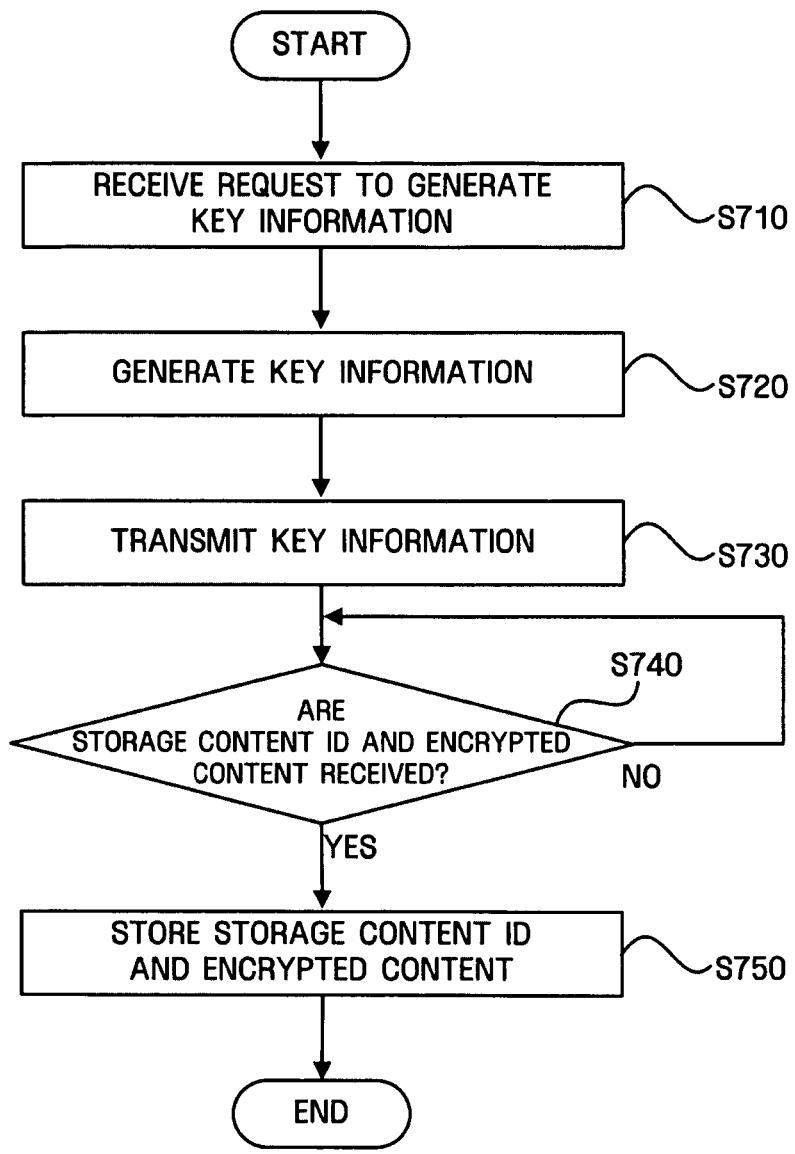
FIG. 7 is a flowchart illustrating a content management method according to another embodiment of the present invention.

FIG. 7 is a flowchart illustrating a content management method according to another embodiment of the present invention, illustrating the operation of the content storage apparatus 400 during the content storage procedure.

When the device interface module 410 receives a request for transmission of key information from the display apparatus 200 (operation S710), the control module 420 generates predetermined key information (operation S720). As shown, the predetermined key information generated by the control module 420 is a random number generated by the random number generating module 430, a DTLA key value, or a combination thereof.

The device interface module 410 transmits the predetermined key information generated by the control module 420 to the content management apparatus 300 (operation S730). When the device interface module 410 receives the storage content ID and encrypted content from the content management apparatus 300 (operation S740), the control module 420 stores the encrypted content with the storage content ID in the storage module 440 (operation S750). The encrypted content stored in the storage module 440 is mapped to the storage content ID.

Content Playback Procedure

FIG. 8 is a diagram illustrating a content playback procedure of the content management system according to an embodiment of the present invention. A user can search for a list of contents stored in the content storage apparatus 400 using the display apparatus 200. When a user requests a particular content to be played back ((a)), the display apparatus 200 requests to the content management apparatus 300 or the content storage apparatus 400 to play back the corresponding content ((b),(c)). The content storage apparatus 400 transmits the content requested by the display apparatus 200 and the storage content ID of the corresponding to content to the content management apparatus 300 ((d)).

The content management apparatus 300 confirms the playback restricting information corresponding to the storage content ID received from the content storage apparatus 400 and determines whether to allow the content to be played back or not. If the playback of the content is allowed, the content management apparatus 300 searches for an encryption key for decrypting the encrypted content and the encrypted content is then decrypted using the searched encryption key ((e)).

The content management apparatus 300 transmits the decrypted content to the display apparatus 200 ((f)). The display apparatus 200 displays the content transmitted from the content management apparatus 300 on a screen ((g)). Here, the content management apparatus 300 updates the playback restricting information while the content is provided to the display apparatus 200 ((h)).

Figure 9:
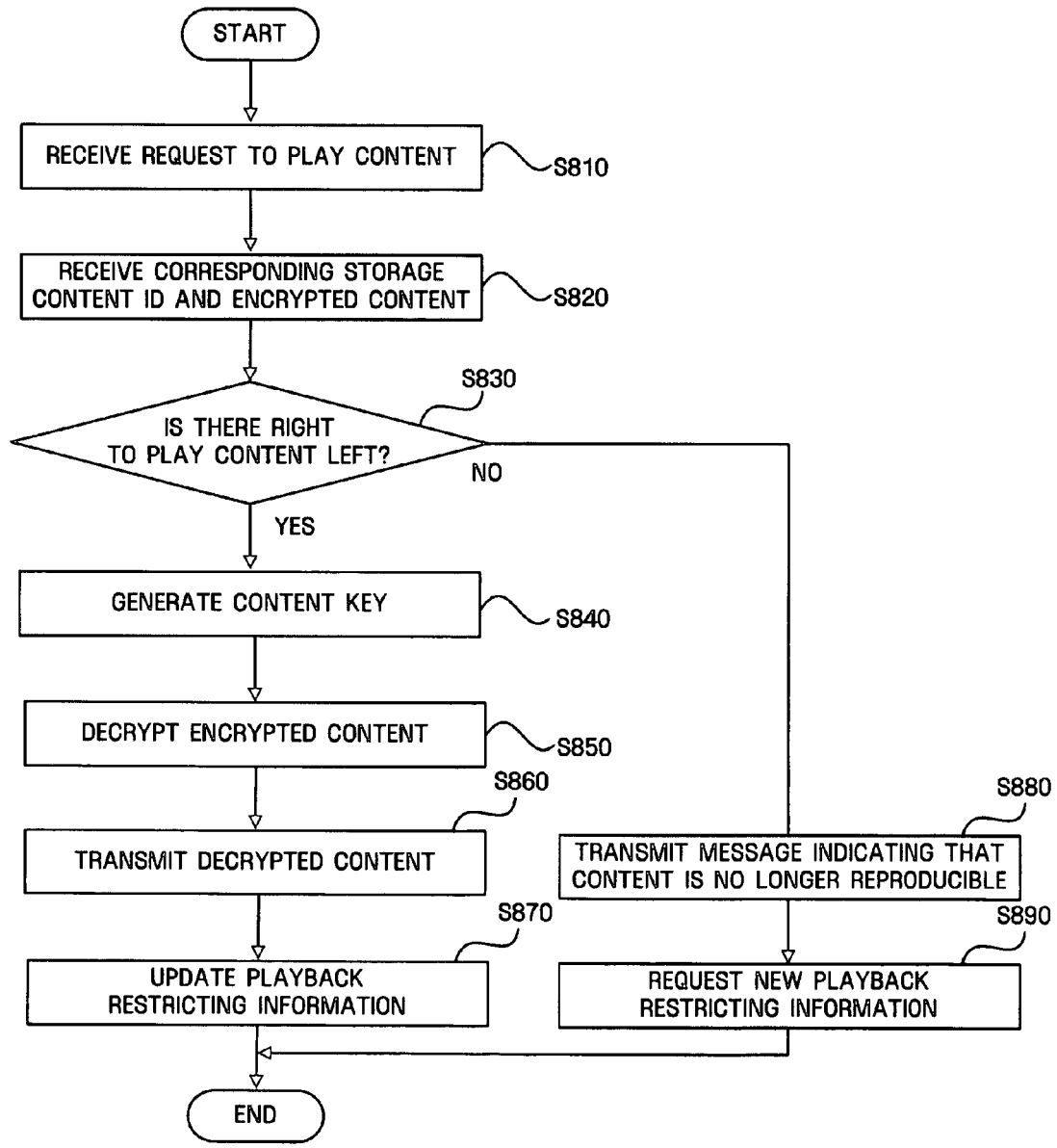
FIG. 9 is a diagram illustrating a content playback procedure of the content management system according to another embodiment of the present invention.

Hereinafter, the operation of the content management apparatus 300 during the content playback procedure will be described in greater detail with reference to FIG. 9. FIG. 9 is a flowchart illustrating a content playback procedure of the content management system according to another embodiment of the present invention.

When the device interface module 360 receives a content playback request from the display apparatus 200 in operation S810 and a storage content ID and an encrypted content are received from the content storage apparatus 400 in operation S820, the control module 370 determines whether a right to play back content is left based on the playback restricting information corresponding to the received storage content ID (operation S830). For example, if the count constraint is set in the playback restricting information, the control module 370 determines whether the number of times of content playback is sufficient for another playback.

If the control module 370 determines that a right to play content is left (YES in operation S830), the management module 390 provides the encryption/decryption module 380 with a content key corresponding to the received storage content ID (operation S840). The encryption/decryption module 380 decrypts the encrypted content received from the content storage apparatus 400 using the content key received from the management module 390 (operation S850). In operation S860, the device interface module 360 transmits the decrypted content to the display apparatus 200. While not required in all aspects, the control module 370 may update the playback restricting information of the content transmitted from the device interface module 360 in operation S870. For example, the control module 370 counts the number of times of playback of the content provided to the display apparatus 200. Alternatively, the control module 370 may count the accumulated period of playback time while the content is provided to the display apparatus 200. Alternately, the counting can be performed prior to or at the completion of the playback, or need not be updated where the constraint is only time based as in constraint 520.

If control module 370 determines that a right to play content is not left (NO in operation S830), the control module 370 transmits a message indicating that content is no longer reproducible to the display apparatus 200 through the device interface module 360 (operation S880). Thereafter, the control module 370 may request the broadcasting company 100 to transmit new playback restricting information corresponding to the content through the network interface module 350 in operation S890. However, it is understood that operation S890 need not be performed in all aspects of the invention. Moreover, it is understood that a partial playback could be provided, such as where an edited version of the content can be utilized.

While the content management apparatus 300, the display apparatus 200, and the content storage apparatus 400 have been described and illustrated independently in the respective embodiments, the present invention is not limited thereto and can also be applied to a content management system having one or more devices of the content management apparatus 300, the display apparatus 200, and the content storage apparatus 400 integrally formed. In such a case, functionally similar modules among modules constituting various devices may be combined into a single module. In addition, when one or more devices are combined with each other, additional modules may further be provided for better functionality of the respective modules. Moreover, while not required in all aspects of the invention, elements can be implemented as software and/or firmware executable by general or special purpose processors and/or computers.

Although aspects of the present invention have been described in connection with the exemplary embodiments of the present invention, it will be apparent to those skilled in the art that various modifications and changes may be made thereto without departing from the scope and spirit of the invention, the scope of which is defined in the claims and their equivalents. Therefore, it should be understood that the above embodiments are not limitative, but illustrative in all aspects.

What is claimed is:

1. A method of managing content comprising:
reconstructing, by a content management apparatus, a content received from a content provider;
transmitting, from the content management apparatus after receiving the content, a content ID and authentication information to the content provider, the content ID used to identify the content received from the content provider;
receiving, at the content management apparatus, content management information corresponding to the content ID from the content provider;
encrypting, by the content management apparatus, the reconstructed content based on the received content management information; and
storing the encrypted content in a content storage apparatus,
wherein the authentication information includes key information which is used to encrypt the content management information.

2. The method of claim 1, wherein the authentication information includes a storage medium ID capable of discriminating a portable storage medium indicating a broadcast signal descrambling right and/or key information received from the content storage apparatus.

3. The method of claim 2, wherein the key information includes at least one of a random number, a digital transmission licensing administrator (DTLA) key value, or a combination thereof.

4. The method of claim 2, wherein the key information is received from the content storage apparatus.

5. The method of claim 1, wherein the transmitting of the content ID and the authentication information comprises:
    extracting a public key corresponding to the content ID from a signal received from the content provider;
    encrypting the authentication information using the extracted public key; and
    transmitting the content ID and the encrypted authentication information to the content provider.

6. The method of claim 5, wherein the encrypted authentication information is transmitted together with a predetermined hash value of the authentication information.

7. The method of claim 1, wherein
    the content key and playback restricting information received from the content provider are encrypted using the authentication information, and
    the encrypting comprises decrypting the encrypted content key and playback restricting information using the authentication information.

8. The method of claim 1, further comprising:
    when the encrypted content is received from the content storage apparatus, decrypting the encrypted content using the content key; and providing the decrypted content to a display apparatus.

9. The method of claim 8, wherein the content management information further includes playback restricting information of the content indicating if playback is allowed and the decrypting of the encrypted content is performed when it is determined that a right to play exists according to the playback restricting information.

10. The method of claim 9, further comprising updating the playback restricting information while the decrypted content is provided to the display apparatus when the right to play exists for the playback.

11. The method of claim 9, wherein the playback restricting information includes a restricted number of times of playback, a restricted number of days of playback, and a restricted accumulated period of playback, or combinations thereof.

12. The method of claim 1, wherein the content is provided to be included in a broadcast signal.

13. The method of claim 1, further comprising receiving information regarding contents from the content provider, and displaying the information regarding contents on a display device.

14. An apparatus for managing content comprising:
    a reconstruction module which reconstructs a content received from a content provider;
    a network interface module which transmits a content ID and authentication information to the content provider after receiving the content and receives content management information corresponding to the content ID from the content provider, the content ID being used to identify the content received from the content provider;
    an encryption/decryption module which encrypts the reconstructed content based on the received content management information; and
    a device interface module which stores the encrypted content in a content storage apparatus,
    wherein the authentication information includes key information which is used to encrypt the content management information.

15. The apparatus of claim 14, wherein the authentication information includes at least one of a storage medium ID indicating a portable storage medium having a broadcast signal descrambling right and/or key information received from the content storage apparatus.

16. The apparatus of claim 15, wherein the key information includes at least one of a random number, a digital transmission licensing administrator (DTLA) key value, or a combination thereof.

17. The apparatus of claim 15, wherein the key information is received from the content storage apparatus.

18. The apparatus of claim 14, further comprising a management module which extracts a public key corresponding to the content ID from a signal received from the content provider, and the encryption/decryption module encrypts the authentication information using the extracted public key.

19. The apparatus of claim 18, wherein the network interface module further transmits a predetermined hash value of the authentication information to the content provider.

20. The apparatus of claim 14, wherein the content key and playback restricting information received from the content provider are encrypted using the authentication information and the encryption/decryption module decrypts the encrypted content key and playback restricting information using the authentication information.

21. The apparatus of claim 14, wherein if the device interface module receives the encrypted content from the content storage apparatus, the encryption/decryption module decrypts the encrypted content using the content key, and the device interface module provides the decrypted content to a display apparatus.

22. The apparatus of claim 21, wherein the content management information further include playback restricting information of the content indicating if playback is allowed and the encryption/decryption module decrypts the encrypted content when it is determined that a right to play remains based on the playback restricting information.

23. The apparatus method of claim 22, further comprising a control module which updates the playback restricting information while the decrypted content is provided to the display apparatus.

24. The apparatus method of claim 22, wherein the playback restricting information includes a restricted number of times of playback, a restricted number of days of playback, and a restricted accumulated period of playback.

25. A method managing content comprising: transmitting, from a managing apparatus, a content ID to a content source from which content corresponding to the content ID has been received; receiving at the managing apparatus content management information corresponding to the content ID from the content source and which restricts reproduction of the received content; and storing by the managing apparatus the content management information such that, prior to reproduction of the stored content, the managing apparatus can recall the stored content management information to restrict reproduction of the stored contents, wherein: the receiving at the managing apparatus the content management information comprises receiving encryption information related to the content ID, and the controlling the content to be stored comprises encrypting by the managing apparatus the content according to the received encryption information, and controlling the encrypted content to be stored on the medium.

26. The method of claim 25, wherein the transmitting the content ID comprises generating by the managing apparatus authentication information indicating that the managing apparatus is authorized to receive the contents, and sending the authentication information with the content ID.

27. The method of claim 25, wherein:
- the receiving at the managing apparatus the content management information comprises receiving encryption information related to the content ID, and
- the controlling the content to be stored comprises encrypting by the managing apparatus the content according to the received encryption information, and controlling the encrypted content to be stored on the medium.

28. The method of claim 25, wherein the content management information includes information used by the managing apparatus to limit reproduction of the stored content to a predetermined number of reproductions and/or time for reproduction of the stored contents.

29. The method of claim 28, wherein the transmitting the content ID comprises:
- generating by the managing apparatus authentication information indicating that the managing apparatus is authorized to receive the contents, and
- encrypting and sending the authentication information with the content ID.

30. A non-transitory computer readable medium encoded with a program for performing the method of claim 25 implemented using one or more computers.

31. A method of remotely managing stored content comprising: sending content from a content source to be reproduced at a receiver; receiving at the content source a content ID corresponding to the sent content and authentication information; and sending from the content source to the receiver content management information corresponding to the received content ID and which allows storage of the sent content on a medium and restricts subsequent reproduction of the stored content by the receiver, wherein the authentication information includes key information which is used to encrypt the content management information, wherein the sending the content management information further comprises sending encryption information related to the content ID used by the receiver to encrypt and store the sent contents on the medium.

32. The method of claim 31, wherein the receiving the content ID comprises receiving a hash value with the authentication information generated by the receiver, and determining whether the received hash value matches a result value of a hash function performed with respect to the authentication information to verify the integrity of the received content ID and authentication information.

33. The method of claim 31, wherein the sending the content management information further comprises sending encryption information related to the content ID used by the receiver to encrypt and store the sent contents on the medium.

34. The method of claim 31, wherein the content management information includes information set by the content source to limit reproduction of the stored content to a predetermined number of reproductions and/or time for reproduction of the stored contents.

35. A non-transitory computer readable medium encoded with a program for performing the method of claim 31 implemented using one or more computers.

* * * * *